US010614161B2

(12) United States Patent
Käbisch et al.

(10) Patent No.: US 10,614,161 B2
(45) Date of Patent: Apr. 7, 2020

(54) METHOD FOR INTEGRATION OF SEMANTIC DATA PROCESSING

(71) Applicants: Sebastian Käbisch, Augsburg (DE); Daniel Peintner, Meransen Mühlbach (IT)

(72) Inventors: Sebastian Käbisch, Augsburg (DE); Daniel Peintner, Meransen Mühlbach (IT)

(73) Assignee: Siemens Aktiengesellschaft, München (DE)

( * ) Notice: Subject to any disclaimer, the term of this patent is extended or adjusted under 35 U.S.C. 154(b) by 253 days.

(21) Appl. No.: 15/542,116

(22) PCT Filed: Nov. 18, 2015

(86) PCT No.: PCT/EP2015/076953
§ 371 (c)(1),
(2) Date: Jul. 7, 2017

(87) PCT Pub. No.: WO2016/110356
PCT Pub. Date: Jul. 14, 2016

(65) Prior Publication Data
US 2018/0260386 A1 Sep. 13, 2018

(30) Foreign Application Priority Data

Jan. 8, 2015 (DE) .................. 10 2015 200 116

(51) Int. Cl.
*G06F 17/27* (2006.01)
*G06F 16/83* (2019.01)
(Continued)

(52) U.S. Cl.
CPC .......... *G06F 17/2785* (2013.01); *G06F 16/83* (2019.01); *G06N 5/02* (2013.01); *G06F 16/367* (2019.01); *G06F 16/84* (2019.01)

(58) Field of Classification Search
CPC .... G06F 17/2785; G06F 16/367; G06F 16/84; G06F 16/951; G06F 16/83; G06N 5/02
See application file for complete search history.

(56) References Cited

U.S. PATENT DOCUMENTS

| 8,429,179 | B1 * | 4/2013 | Mirhaji ................. G06F 17/274 707/756 |
| 2009/0183067 | A1 * | 7/2009 | Fablet ................. G06F 17/2247 715/234 |
| 2009/0210783 | A1 * | 8/2009 | Bellessort ........... G06F 17/2247 715/234 |

FOREIGN PATENT DOCUMENTS

| CN | 103592925 A | 2/2014 |
| CN | 103678418 A | 3/2014 |

OTHER PUBLICATIONS

"W3C: Workshop on the Web of Things, Enablers and services for an open Web of Devices"; URL: http://www.w3.org/2014/02/wot/reporthtml [dated Jan. 10, 2015]; 2014.
(Continued)

*Primary Examiner* — Quoc A Tran
(74) *Attorney, Agent, or Firm* — Lempia Summerfield Katz LLC

(57) ABSTRACT

The invention relates to a method for integration of semantic data processing in a device, in particular in a field device of automation technology. In this case, a generic description language scheme is used to define a semantic repository as a starting basis. According to the invention, said description language scheme is enriched with content from an ontology for semantic representation of a mode of operation of the device. Classes and/or subclasses of the ontology, together with at least one characteristic assigned to the classes and/or subclasses and taken from the ontology, are converted into a corresponding scheme declaration and said scheme declaration is inserted into the description language scheme.

(Continued)

One or more grammars are then generated from the description language scheme, preferably grammars according to the standardised data format "Efficient XML Interchange", abbreviated to EXI, which are integrated in the device. A particular advantage of the invention is substantially compact semantic data processing and data transmission.

20 Claims, 2 Drawing Sheets

(51) Int. Cl.
| | | |
|---|---|---|
| G06N 5/02 | (2006.01) | |
| G06F 16/36 | (2019.01) | |
| G06F 16/84 | (2019.01) | |
| G06F 17/00 | (2019.01) | |

(56) References Cited

OTHER PUBLICATIONS

Fernandez, Javier D. et al.:"Efficient RDF Interchange (ERI) Format for RDF Data Streams"; in: The Semantic Web—ISWC 2014. Riva del Garda, Italy: Springer International; vol. 2; pp. 244-259; ISBN 978-3-319-11914-4.; 2014.
German Office Action for related German Application No. 10 2015 200 116.4 dated Oct. 1, 2015, with English Translation.
German Search Report for related German Application No. 10 2015 200 116.4 dated Oct. 1, 2015, with English Translation.
Hasemann, Henning et al.:"RDF provisioning for the Internet of Things"; in: 3rd International Conference on the Internet of Things (IOT),2012. Wuxi: IEEE,2012; pp. 143-150; ISBN 978-1-4673-1345-2; http://ieeexplore.ieee.org/xpls/abs_all.jsp?arnumber=6402316 [dated Jan. 10, 2015]; 2012.
Hernandes-Illera, Antonio et al.:"Serializing RDF in Compressed Space"; in: URL: http://www.researchgate. net/publication/270566502_ Serializing_RDF _in_Compressed_Space [dated Jan. 10, 2015].
Heuer, Jörg et al:"Web of Things Technologies for Embedded Applications"; in: Position Paper for W3C Workshop on the Web of Things, 2014; URL: http://www.vy3.org/2014/02/wot/papers/heuer.pdf [dated Jan. 10, 2015] XP055245808;; 2014.
Jennings, et al.:"Media Types for Sensor Markup Language (SENML)"; in: Network Working Group—Internet Daraft; URL: http://tools.ietf.org/pdf/draft-jennings-senml-1 O.pdf [dated Jan. 10, 2015]; 2012.
Kyusakov Rumen et al: "Efficient XML Interchange in factory automation systems"; IECON 2011—37th Annual Conference on IEEE Industrial Electronics Society; pp. 4478-4483; XP032105168; DOI: 10.1109/IECON.2011.6120046; ISBN: 978-1-61284-969-0.
Käbisch, Sebastian et al:"Optimized XML-based Webservicegeneration for service communication in restricted embedded environments"; in: IEEE 16th Conference on Emerging Technologies Factory Automation (ETFA), 2011; pp. 1-8; ISSN 1946-0740; http://ieeexplore.ieee.org/xpls/abs_all.jsp?arnumber=6059002 [dated Jan. 10, 2015]; 2011.
Pan, Jeff Z. et al.:"Compressing RDF data by summarisation, serialization and predictive encoding. K-Drive Technical report, WP3-TR2-2014"; in; URL: http://www.kdrive-project.eu/wp-content/uploads/2014/06WP3-TR2-2014 _ SSP. pdf [ abgerufen am Jan. 10, 2015]; 2014.
PCT International Search Report and Written Opinion of the International Searching Authority dated Feb. 15, 2016 for corresponding PCT/EP2015/076953, with English Translation.
Sebastian Kabisch et al:"Efficient and Flexible XML-based Data-Exchange in Microcontroller-based Sensor Actor Networks", 2010, 5th International IEEE SOCNE Workshop on Service Oriented Architectures in Converging Networked Environments; Advanced Information networking and Application Workshops (WAINE); 24th Conference on; ISBN: 978-1-4244-6701-3 pp. 508-513; XP031687072.
Sebastian Käbisch et al: "Standardized and Efficient RDF Encoding for Constrained Embedded Networks"; The Semantic Web. Latest Advances and New; Domains; LNCS 9088; XP055245802; Cham, Switzerland; DOI: 10.1007/978-3-319-18818-8 27; ISBN: 978-3-319-18818-8; URL:http://rd.springer.com/content/pdf/10. 1007% 252F978-3-319-18818-8_27.pdf; [dated Jan. 28, 2016]; pp. 437-452.
Yu Chunyan et al: "Mobile Data Exchange Model for Large-scale Campus Network based on EXI"; 3rd International Conference on Computer Science and Service System ( CSS 2014 ); URL: http//www.atlantis-press.com/php/download_paper.php?id=12793; XP055245805; pp. 669-673; 2014.
Yusuke Doi et al.: "XML-less EXI with code generation for integration of embedded devices in web based systems"; 3rd International Conference on the Internet of Things (IOT); pp. 76-83; XP032297313; DOI: 10.1109/IOT.2012.6402307; ISBN: 978-1-4673-1347-6; 2012.
Chinese Office Action for Chinese Application No. 201580072731.X dated Dec. 23, 2019.

* cited by examiner

METHOD FOR INTEGRATION OF SEMANTIC DATA PROCESSING

CROSS-REFERENCE TO RELATED APPLICATIONS

This application is the National Stage of International Application No. PCT/EP2015/076953, filed Nov. 18, 2015, which claims the benefit of German Patent Application No. DE 102015200116.4, filed Jan. 8, 2015. The entire contents of these documents are hereby incorporated herein by reference.

BACKGROUND

The present embodiments relate to a method for integrating semantic data processing (e.g., in automation devices).

Field devices, or devices that operate based on microcontrollers (e.g., intelligent sensors, actuators and control units in automation or in a vehicle), are known in the prior art. As the complexity of automation installations increases, there is an increasing need to equip devices with an ability to process data in a structured and interpretable form together with a semantic description (e.g., for data processing similar to the principles of a "semantic web").

Semantic data processing in devices is desired (e.g., in order to facilitate engineering of the devices) to avoid or detect errors during operation and to optimize automation installations by optimally parameterizing the devices.

Semantic data processing that is currently widespread in the field of sophisticated information processing is operated based on ontologies. Ontologies are a knowledge representation for a defined area of knowledge (e.g., a domain) with the aim of interchanging and using knowledge in a machine-readable form. An ontology provides far-reaching possibilities for forming properties (e.g., relations) between classes (e.g., concepts) of the domain, and provides the methods required for semantic data processing. On account of data-related powerfulness of ontologies, working with ontologies requires a computing environment with ample resources.

Techniques of the semantic web have been transferred to semantic data processing of devices and other automation components. However, processing of semantic data based on ontologies is not provided because of the restricted resources of devices. The restricted resources may include a comparatively small memory area, a narrow communication bandwidth, and a CPU or microcontroller with few resources as a central computing unit.

Semantic data processing that is "lighter" (e.g., light-weight) in comparison is based on a known data model called the "Resource Description Framework" (RDF). The RDF data model has formal semantics based on directed graphs. The data in the data model is modeled as triples. Triples are an elementary statement that includes a subject, predicate and object. A semantic repository, or a triple store among experts, are known for storing RDF triples. Triple stores may also be referred to as μRDF in devices equipped with a limited storage space and computing power range. The standardized data format "Efficient XML Interchange" (EXI) is suitable for implementing a μRDF on devices.

Description languages for specifying data formats and the methods for processing the data are known. One known description language is "Extensible Markup Language" (XML). XML is used to describe hierarchically structured data in text form or plain text. The XML description language is used to interchange data between computer systems in a platform-independent manner. On account of the textual nature of XML, XML may be read by machines and by persons. Schemes used to describe a structure and to define data types are also known. These schemes are based on a description language (e.g., XML), and the schemes are referred to as description language schemes. A scheme for using XML data is also known as an XML Scheme Definition (XSD).

Rapid interchange of data between computer systems, and/or rapid internal data processing, is/are often required and cannot be achieved using a textual description language such as XML. Binary representations of XML were therefore proposed. Such a binary representation is the above-mentioned EXI interchange format that may be processed more quickly than text-based XML data and requires less transmission bandwidth when interchanging data between computer systems. Moreover, use of EXI is not restricted only to a binary representation of XML, and EXI may be used as an interchange format for processing and transmitting any desired semi-structured data.

The EXI binary representation displays advantages (e.g., during use in devices). Devices may be set up for device-internal processing of data in the text-based XML format, or in the EXI interchange format, but may interchange data with one another via corresponding communication interfaces based on binary data (e.g., binary data according to EXI specifications).

The EXI binary representation is particularly efficient if EXI grammar has been defined (e.g., grammar that best represents a semantic representation or description of the data). This grammar is usually produced from the XML schemes explained above. The more specific this grammar (e.g., with regard to the structure of the data, contents of the data, data types), the more efficient and compact coding of the grammar and the grammar implementation are.

However, a semantic description of devices is currently not available in the majority of cases. At present, such descriptions are defined only experimentally in an ad-hoc manner in an engineering tool, and the semantic descriptions remain only in the engineering tool environment in a proprietary format.

In contrast, it would be desirable to use widespread ontologies (e.g., from the automation domain) in the implementation or engineering of devices.

SUMMARY AND DESCRIPTION

The scope of the present invention is defined solely by the appended claims and is not affected to any degree by the statements within this summary.

One or more of the present embodiments may obviate one or more of the drawbacks or limitations in the related art. For example, one or more of the present embodiments produces grammar (e.g., for use in devices with few resources) from a description language scheme, a semantic representation of a method of operation of the device being at least partially integrated from at least one ontology provided per se for computing environments with ample resources.

One or more of the present embodiments provides a method for integrating semantic data processing in a device (e.g., an automation field device). The method includes providing a description language scheme for defining a semantic repository and providing an ontology for semantically representing a method of operation and/or data of the device. The method also includes reading at least one class, with at least one property assigned thereto, from the ontology and inserting a corresponding scheme declaration into the description language scheme, producing grammar from the description language scheme, and integrating the grammar in the device.

One or more of the present embodiments provides for an existing generic description language scheme to be used as a starting point for defining a semantic repository. This description language scheme may be based on a known data model called "Resource Description Framework" or RDF. The description language scheme or scheme is suitable for implementing a triple store or μRDF in devices (e.g., field devices) equipped with a limited storage space and computing power range. The description language scheme is at least partially enriched with contents from an ontology for semantically representing a method of operation of the device. Classes of the ontology, together with at least one property assigned to the classes, are removed from the ontology, are converted into a corresponding scheme declaration, and the scheme declaration is inserted into the description language scheme. The classes may also include subclasses that are subordinate to a class by way of a property or relation "subClassOf". The description language scheme, available after at least one scheme declaration has been inserted, is referred to as an "extended" or "specific" description language scheme in the further description because the integration of the device description from the ontology results in a description language scheme that takes into account the specifics of the device. One or more grammars (e.g., grammars according to the standardized data format "Efficient XML Interchange" (EXI)) are produced from the description language scheme and are integrated in the device (e.g., loaded as part of control software).

One or more of the present embodiments provide that the "specific" description language scheme may be used to produce grammar that allows considerably more compact semantic data processing and data transmission (e.g., between field devices or between field devices and an automation system).

The compactness of the data processing allows faster semantic data processing. The compactness also results in smaller data packet sizes that reduce the probability of a data packet having to be transmitted again in the event of a data packet loss (e.g., retransmission). Reducing retransmissions has a positive influence on the network utilization during communication between a plurality of field devices, or during communication between field devices and an automation system.

One or more of the present embodiments provides that implementations of the grammar produced use less storage space because the grammar contains fewer text-based (e.g., string-based) element names (e.g., identifier) than grammars that have not been produced using a structured device description (e.g., as provided by the ontology). The grammar allows text-based element names to be replaced with data type coding (e.g., type coding) in a manner determined by the system.

One or more of the present embodiments provides a computer program product. The computer program is executed in a processor of a provisioning computer (e.g., an engineering system for developing software inside the field device) that carries out the method with the execution.

DETAILED DESCRIPTION

A semantic description as a prerequisite for semantic data processing of devices (e.g., automation devices or field devices), and may currently be found only to some extent. Current approaches provide for semantic descriptions to be input "manually" only in an engineering phase using an engineering tool.

A semantic description that enables a "self-description" of the devices may also be achieved in devices with few resources based on the binary representation "Efficient XML Interchange" (EXI). Because a concept for a specific XML scheme is currently not available in the domains of the "semantic web" or "linked data" domain, a generic approach corresponding to "schemeless" coding according to EXI conventions may be selected in a first attempt. This approach, which is not based on any XML schemes or EXI grammars produced from XML schemes, proves to be disadvantageous on account of the coding that is not very efficient and is not very compact.

In contrast, one or more of the present embodiments provides for a description language scheme for defining a semantic repository.

The semantic repository based on the known data model "Resource Description Framework" (RDF) provides for data to be modeled in semantic triples. A description language scheme (e.g., an XML scheme) represents a structure of the semantic triples in the description language and is defined based on RDF. An exemplary description language scheme in the XML description language is illustrated below:

```
<!-- root -->
<xs: element name="RDF">
<xs:complexType>
    <xs:sequence>
        <xs:element ref="rdf:Description" maxOccurs="unbounded"/>
    </xs:sequence>
</xs:complexType>
</xs:element>
<!-- subject -->
<xs:element name="Description">
    <xs:complexType>
        <xs:sequence>
            <!-- property -->
            <xs:any maxOccurs="unbounded" namespace="##any" processContents="lax"/>
        </xs:sequence>
```

```
        <xs:attribute name="about" type="xs:anyURI" use="required"/>
    </xs:complexType>
</xs:element>
```

The declaration:
<xs:complexType>
defines a complex type that implements a state machine. The "root" declaration with "RDF" and the interleaved "description" declaration corresponds to the "default" RDF framework.

The declaration:
<xs:any maxOccurs="unbounded" namespace="##any" processContents="lax"/>
is provided for coding any desired "property" elements occurring at a run time.

Figure 1:
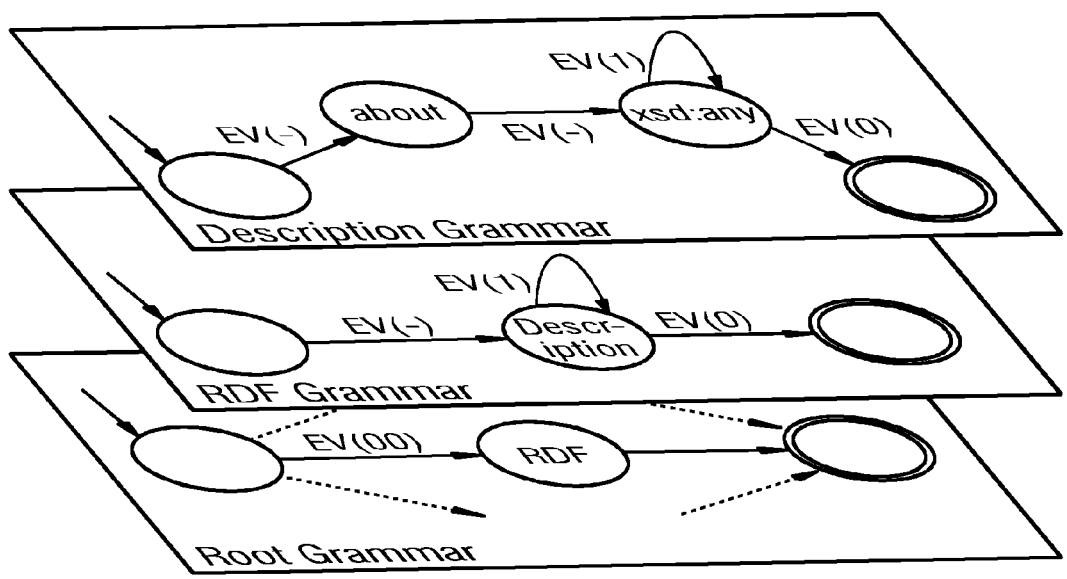
FIG. 1 shows a state diagram of grammar for defining a semantic repository.

FIG. 1 illustrates a state diagram of generic EXI grammar produced from the description language scheme described above. A Deterministic Finite Automaton (DFA), in which circular structures represent a state, is illustrated. Events (e.g., EV in FIG. 1) cause state transitions (e.g., illustrated in the form of arrows) between states, or cause a loop inside the same state. A final state is illustrated using a double circle line.

The declaration:
<xs:element name="RDF">
results in RDF grammar illustrated on the central level, and the declaration:
<xs:element name="Description">
results in description grammar illustrated on the uppermost level. Root grammar on the lowermost level represents the starting point of grammar.

Based on the generic grammar produced from the description language scheme (e.g., shown above) for defining a semantic repository, any desired semantic descriptions may be represented using this generic grammar. For example, the following triple may be provided:

```
<RDF>
    <Description about= 'temperature'>
        <type resource='sensor'/>
        <value>8.4< /value>
    < /Description>
    <Description about= 'humidity'>
        <type resource='sensor'/>
        <value> 79.2< /value>
        ...
``` defining a structured representation of a temperature sensor and a humidity sensor.

In the triple, the temperature sensor or humidity sensor corresponds to a subject, the measured value or "value" corresponds to a property provided by the temperature sensor or humidity sensor (e.g., a predicate), and the specific measured value (e.g., "8.4" or "79.2" above) corresponds to the attribute of the triple.

An EXI representation of grammar produced would result in the following representation:
  00 'temperature' type resource 'Sensor' value '8.4' 0
  1 'humidity' 0 1 0 3 '79.2'
  . . .
The digits underlined below:
  <u>00</u> 'temperature' type resource 'Sensor' value '8.4' 0
  <u>1</u> 'humidity' 0 1 0 3 '79.2' represent the bit-based event codes from the grammar depicted to FIG. 1 (e.g., the events (or "EV") EV(00), EV(0) and EV(1)).

The fragments underlined below:
  00 '<u>temperature</u>' type resource '<u>Sensor</u>' value '<u>8.4</u>' 0
  1 '<u>humidity</u>' 0 1 0 3 '<u>79.2</u>'
represent values of the attributes or attribute element names. If the same attribute element name recurs, a numerical identifier is used instead of the textual attribute element name (e.g., the "0" for "sensor"), for reasons of data compression. A separate mapping table is maintained for representing the attribute element names.

The fragments underlined below:
  00 'temperature' <u>type</u> <u>resource</u> 'Sensor' <u>value</u> '8.4' 0
  1 'humidity' <u>0</u> <u>1</u> 0 <u>3</u> '79.2' . . .
represent the values of the (e.g., new) property element names. If the same property element name recurs, a numerical identifier is used instead of the property element name (e.g., the "0" for "type", "1" for "resource" and "3" for "value"), for reasons of data compression.

One or more of the present embodiments provide for a further specification of the grammar to be produced from the description language scheme shown above to be brought about by including elements of an ontology for semantically representing a method of operation of the device in the description language scheme. The ontology elements are included by integrating a corresponding scheme declaration in the description language scheme.

A device (e.g., a field device) has a fixed method of operation with particular fixed and known parameters and data. A description of this method of operation is at least partially represented by an ontology. Based on the description of the ontology, semantic information from the ontology is represented in scheme declarations. The description language scheme extended is converted into extended "specific" grammar. The specific grammar results in a considerable increase in efficiency and compactness of the coding. For example, the specific grammar results in a generic data property (e.g., such as the property element "value" shown above) not having to be transferred to a text-based form and managed at the run time. The more specific grammar may result in values in text-based form (e.g., "sensor") being avoided at run time.

Previous use of an ontology for validation purposes is thus extended with an advantageous use of the ontology to produce specific grammar resulting in efficient data processing.

The following information may be represented from semantic information from the ontology in scheme declarations: RDF framework (e.g., elements/attributes such as RDF, description, about, type, etc.); Properties (e.g., "data properties" and "object properties", including designators or element names); used data types of the properties; names of the classes; and/or name spaces.

Grammar (e.g., EXI grammar) is produced from the description language scheme that has been extended with the semantic information from the ontology and is intended to define a semantic repository. The grammar is integrated in the device (e.g., the field device). A more compact representation is then achieved when transmitting data and during the internal semantic data processing. Furthermore, the processing of the semantic data becomes more efficient on account of accelerated parsing operations and memory usage is greatly reduced.

Figure 2:
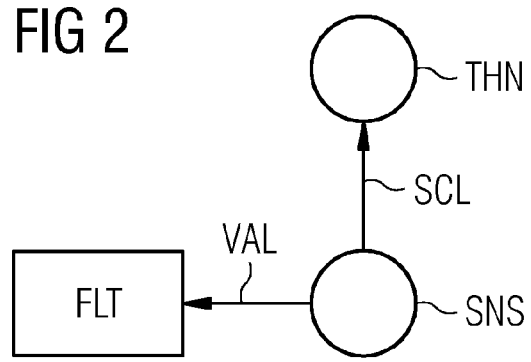
FIG. 2 shows a schematic illustration of an exemplary ontology for semantically representing a method of operation of the device.

FIG. 2 shows a schematic illustration of an exemplary ontology for semantically representing a method of operation of a device. In this ontology, two classes THN, SNS are symbolized by circles. The first class SNS of the two classes (e.g., "concepts") is linked to the second class THN of the two classes via a property subclass SCL (e.g., "relation") indicating the relationship between the two classes THN, SNS. A "property" VAL, assigned to a data type FLT, is also defined for the first class SNS. This object type FLT is also referred to as a "type" or "range".

The preceding structural description of the exemplary ontology is described below with specific elements. A first class "sensor" SNS is assigned to a second class "thing" THN via the relationship "is a subclass of" SCL. The second class "thing" forms a (e.g., default) class provided in the ontology from the outset and forms a generic root class. The relationship "is a subclass of" SCL is used to form a subclass "sensor" SNS. This class SNS has a property "value" VAL defining the data type FLT. The data type FLT is in the form of a floating-point number or "float".

A definition of the exemplary ontology according to FIG. 2 in an ontology description language OWL or Web Ontology Language is provided as follows:

```
...
<owl:Class rdf:about="Thing"/>
<owl:Class rdf:about="Sensor">
    <rdfs:subClassOf rdf:resource="Thing"/>
</owl:Class>
<owl:DatatypeProperty rdf:about="value">
    <rdfs:domain rdf:resource="Sensor"/>
    <rdfs:range rdf:resource="float"/>
</owl:DatatypeProperty>
...
```

In this section of the ontology description language for defining the ontology according to FIG. 2, a sensor class, which is a subclass of "things", is defined. The sensor class has a property (e.g., data property) "value" that has the range "float".

The class "thing" is defined by the line:
<owl:Class rdf:about="Thing"/>
The class "sensor" is defined by the fragment:

```
<owl:Class rdf:about="Sensor">
    <rdfs:subClassOf rdf:resource="Thing"/>
</owl:Class>
```

The class "sensor" is assigned to the superordinate class "thing" as a subclass via the relationship or property "subclassOf". A subclass is may also be a class.

The classes and subclasses, together with properties assigned to the subclasses from the ontology, are read from the ontology or the ontology description language, and corresponding scheme declarations are inserted into the following extended description language scheme:

```
...
<!-- root -->
<xs:element name="RDF">
<xs:complexType>
    <xs:sequence>
        <xs:element ref="rdf:Description" maxOccurs="unbounded"/>
    </xs:sequence>
</xs:complexType>
</xs:element>
<!-- subject -->
<xs:element name="Description">
    <xs:complexType>
        <xs:sequence>
            <!--property -->
            <xs:element ref="rdf:type"/>
            <xs:element name="value" type="xs:float" />
        </xs:sequence>
        <xs:attribute name="about" type="xs:anyURI" use="required"/>
    </xs:complexType>
</xs:element>
<xs:element name="type" type="rdf:classes"/>
    <xs:simpleType name="classes">
    <xs:restriction base="xs:string">
        <xs:enumeration value="Sensor"/>
        <xs:enumeration value="Thing"/>
    </xs:restriction>
</xs:simpleType>
...
```

The "root" declaration with "RDF" and the interleaved "description" declaration corresponds (e.g., as in the example provided above) to the "default" RDF framework.

An important difference between the extended description language scheme shown here and the description language scheme above is that, in the extended description language scheme, specific properties (e.g., such as "type" and "value") from the ontology are inserted in the "description" scheme declaration of elements.

The property "type" is expressly declared as a "type" element and is provided with an instruction that only classes defined in the ontology (e.g., namely "thing" and "sensor") may be allocated:

```
<xs:element name="type" type="rdf:classes"/>
    <xs:simpleType name="classes">
    <xs:restriction base="xs:string">
        <xs:enumeration value="Sensor"/>
        <xs:enumeration value="Thing"/>
    </xs:restriction>
</xs:simpleType>
```

The selection is implemented by declaring, with the aid of a list (e.g., an enumeration instruction).

A similarly express declaration is provided for the property "value" which, in a similar manner to the ontology (e.g., in the fragment DatatypeProperty) is declared as a float-based element:
<xs:element name="value" type="xs:float"/>

The declaration of a data type (e.g., in addition to floating-point number types, such as float, also Boolean, integer etc.) may be adopted into the scheme declaration from the ontology.

Figure 3:
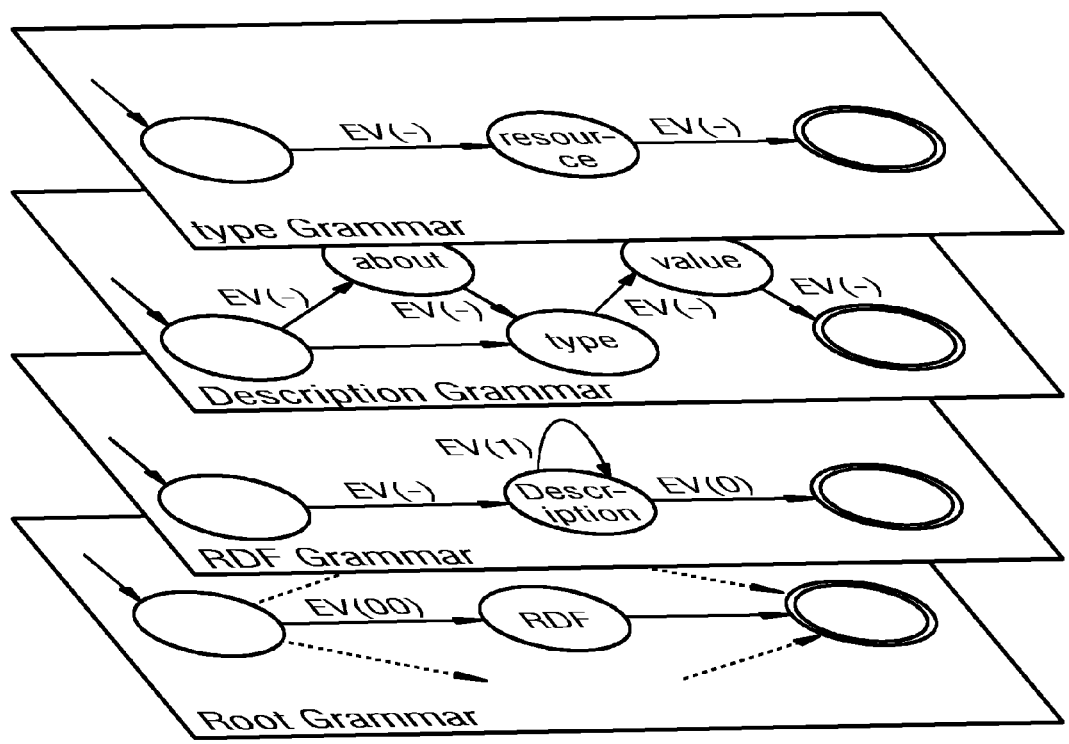
FIG. 3 shows a schematic illustration of grammar extended according to an embodiment.

Grammar extended in accordance with FIG. 3 is produced from the extended description language scheme. The extended grammar contains the specific information from the ontology and from the extended description language scheme created.

The level "description grammar" contains two states "type" and "value" for representing the semantic information.

Mapping the semantic descriptions for a temperature sensor and a humidity sensor:

```
<RDF>
<Description about= 'temperature'>
    <type resource='sensor'/>
    <value>8.4</value>
</Description>
<Description about= 'humidity'>
    <type resource='sensor'/>
    <value> 79.2< /value>
    ...
``` to the extended grammar, the following EXI representation now results:

00 'temperature' 0 '8.4' 1 'humidity' 0 '79.2' . . .

It is immediately evident that the EXI representation is considerably more compact than the two-line EXI representation shown above and provided for use of the generic grammar without the inclusion of the ontology. This example clearly demonstrates the superior compactness of the coding achieved by the present embodiments.

Generic elements such as "type" and "value" are now no longer present, and are indirectly included in the grammar. Furthermore, known class names (e.g., "sensor") may be represented by an enumeration representation in the description language scheme, with the result that only an enumeration value has to be transmitted and may be used on the programming level for processing. The 0 highlighted by underlining below corresponds to the enumeration value "sensor":

00 'temperature' 0 '8.4' 1 'humidity' 0 '79.2' . . .

One or more embodiments use a hybrid approach of EXI. The hybrid approach allows for creating extended grammar from one or more ontologies, but that the state "xs:any" may remain in such grammar in order to code unknown ontologies. In order to provide that the state "xs:any" remains in the grammar, the declaration:

<xs:any maxOccurs="unbounded" namespace="##any" processContents="lax"/> remains in the description language schemes for defining a semantic repository. It is therefore provided that any desired "property" elements that occur at a run time may be coded.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for integrating semantic data processing in a device, wherein the device is an automation field device, the method comprising:
providing a description language scheme for defining a semantic repository;
providing an ontology for semantically representing a method of operation of the device, data of the device, or the method of operation of the device and data of the device;
removing at least one class with at least one property assigned to the at least one class from the ontology by converting the at least one class with the at least one property into a corresponding scheme declaration;
inserting the corresponding scheme declaration into an updated description language scheme;
producing grammar from the updated description language scheme; and
integrating the grammar in the device.

2. The method of claim 1, wherein data properties, object properties, or data properties and object properties are removed from the ontology.

3. The method of claim 2, wherein used data types of the data properties, the object properties, or the data properties and the object properties are removed from the ontology.

4. The method of claim 1, wherein at least one name space is removed from the ontology.

5. The method of claim 1, wherein at least one designator of the classes, subclasses, or the classes and the subclasses is removed from the ontology.

6. The method of claim 1, wherein a plurality of classes, a plurality of subclasses, or the plurality of classes and the plurality of subclasses are inserted into a description scheme declaration by an enumeration instruction.

7. The method of claim 1, wherein a declaration of a data type in the ontology is adopted in the scheme declaration.

8. The method of claim 1, wherein a declaration "xs:any" is provided in the description language scheme for coding further ontologies.

9. The method of claim 1, wherein the grammar is coded in Efficient XML Interchange (EXI).

10. The method of claim 1, wherein the description language scheme is described in Extensible Markup Language (XML).

11. The method of claim 1, wherein the description language scheme is based on a Resource Description Framework (RDF).

12. A non-transitory computer readable storage medium comprising a computer program product with program code that, when executed by a processor, is configured to:
provide a description language scheme for defining a semantic repository;
provide an ontology for semantically representing a method of operation of the device, data of the device, or the method of operation of the device and data of the device;
remove at least one class with at least one property assigned to the at least one class from the ontology by converting the at least one class with the at least one property into a corresponding scheme declaration;
insert the corresponding scheme declaration into an updated description language scheme;
produce grammar from the updated description language scheme; and
integrate the grammar in the device.

13. The non-transitory computer readable storage medium of claim 12, wherein data properties, object properties, or data properties and object properties are removed from the ontology.

14. The non-transitory computer readable storage medium of claim 13, wherein used data types of the data properties, the object properties, or the data properties and the object properties are removed from the ontology.

15. The non-transitory computer readable storage medium of claim 12, wherein at least one name space is removed from the ontology.

16. The non-transitory computer readable storage medium of claim 12, wherein at least one designator of the classes, subclasses, or the classes and the subclasses is removed from the ontology.

17. The non-transitory computer readable storage medium of claim 12, wherein a plurality of classes, a plurality of subclasses, or the plurality of classes and the plurality of subclasses are inserted into a description scheme declaration by an enumeration instruction.

18. The non-transitory computer readable storage medium of claim 12, wherein a declaration of a data type in the ontology is adopted in the scheme declaration.

19. The non-transitory computer readable storage medium of claim 12, wherein a declaration "xs:any" is provided in the description language scheme for coding further ontologies.

20. The non-transitory computer readable storage medium of claim 12, wherein the grammar is coded in Efficient XML Interchange (EXI).

\* \* \* \* \*